No. 632,474. Patented Sept. 5, 1899.
C. T. B. SANGSTER.
MOTOR DRIVEN VEHICLE.
(Application filed Mar. 3, 1899.)
(No Model.) 9 Sheets—Sheet 2.

WITNESSES
INVENTOR

No. 632,474. Patented Sept. 5, 1899.
C. T. B. SANGSTER.
MOTOR DRIVEN VEHICLE.
(Application filed Mar. 3, 1899.)
(No Model.) 9 Sheets—Sheet 4.

Fig. 8.

WITNESSES
INVENTOR
Charles T. B. Sangster
By James L. Norris

No. 632,474. Patented Sept. 5, 1899.
C. T. B. SANGSTER.
MOTOR DRIVEN VEHICLE.
(Application filed Mar. 3, 1899.)
(No Model.) 9 Sheets—Sheet 6.

WITNESSES
INVENTOR
Charles T. B. Sangster
By James L. Norris

No. 632,474. Patented Sept. 5, 1899.
C. T. B. SANGSTER.
MOTOR DRIVEN VEHICLE.
(Application filed Mar. 3, 1899.)
(No Model.)
9 Sheets—Sheet 9.

WITNESSES
INVENTOR
Charles T. B. Sangster
By James L. Norris
Atty

UNITED STATES PATENT OFFICE.

CHARLES THOMAS BROCK SANGSTER, OF BOURNBROOK, ENGLAND.

MOTOR-DRIVEN VEHICLE.

SPECIFICATION forming part of Letters Patent No. 632,474, dated September 5, 1899.

Application filed March 3, 1899. Serial No. 707,647. (No model.)

*To all whom it may concern:*

Be it known that I, CHARLES THOMAS BROCK SANGSTER, general manager of the Cycle Components Manufacturing Company, Limited, a subject of the Queen of Great Britain, residing at Bournbrook, near the city of Birmingham, England, have invented certain new and useful Improvements in Motor-Driven Vehicles, of which the following is a specification.

This invention relates to tricycles driven by motors; and the chief objects of the invention are to provide a new and improved framing for the tricycle by which it is better adapted to carry the motor and its necessary parts between the supporting-wheels, to improve the means by which the tricycle is driven, and to improve the brake mechanism. These objects are accomplished in the manner and by the means hereinafter described and claimed, reference being made to the accompanying drawings, in which—

Fig. 9 represents a longitudinal vertical section of the carbureter and mixing-valves. Fig. 10 is a transverse vertical section of Fig. 9 upon the dotted line $x^4$, showing the means provided for regulating the flow of oil from the reservoir to the evaporating-chamber and for indicating the quantity of oil in the said evaporating-compartment. Fig. $10^A$ is a view of a detail part of the oil-regulator. Fig. 11 is a further section of Fig. 9, taken upon the dotted line $x^5$ to show more clearly the construction of the valve by which the mixture of air with the vapor and the admission of such mixture to the motor is regulated.

The same letters of reference indicate corresponding parts in the several figures of the drawings.

Figure 8:
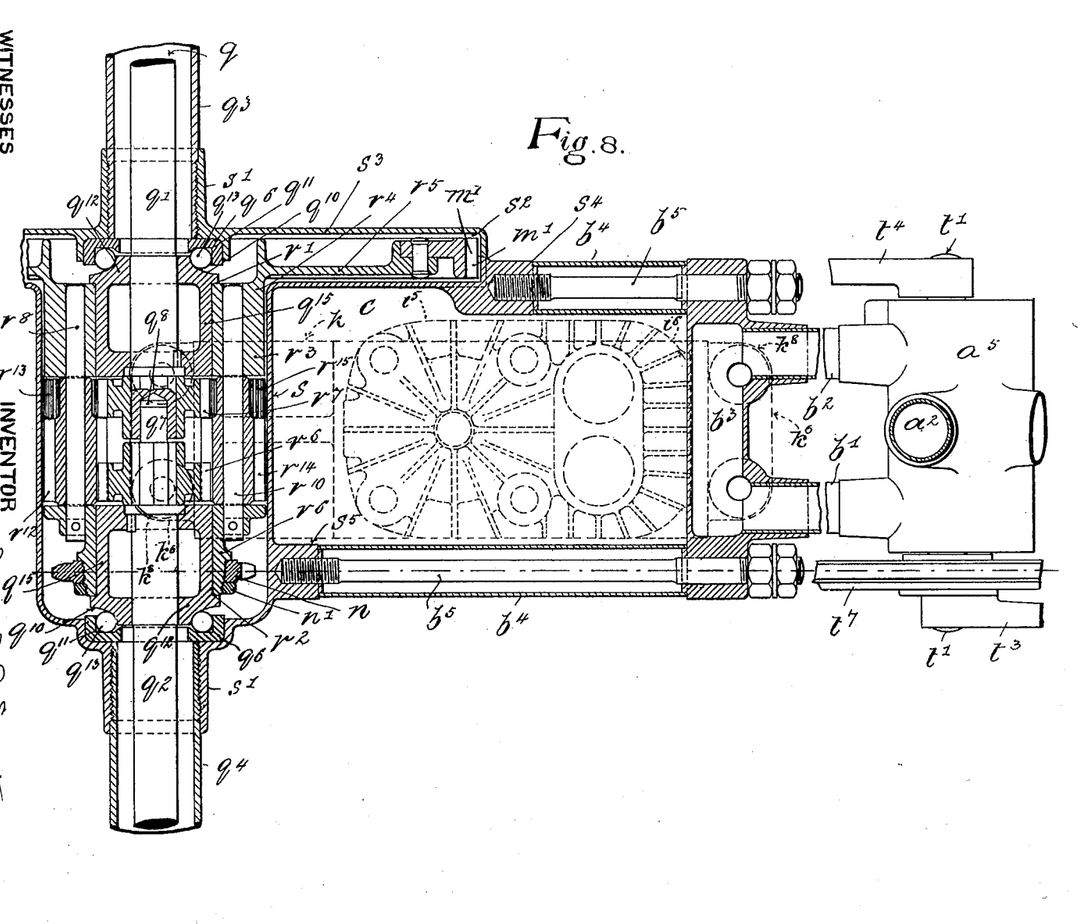
Fig. 8 represents upon the same scale as Figs. 5, 6, and 7 a longitudinal section taken upon the dotted line $x^3$, Fig. 1, to show the arrangement of the differential or balance gear and of the parts of the framing by which the motor and its crank-box are supported.

In the motor-tricycle represented in the drawings the front part $a'$ of the framing of the machine is of the ordinary diamond pattern with the forward end fitted with a ball-head and steering arrangements of any approved construction; but preferably both the head-tube and the forks have strengthening or reinforcing stays arranged in conjunction therewith to impart the necessary strength thereto. The upper end of the seat-tube $a^2$ has the usual clip $a^3$ for the pillar $a^4$, on which the saddle is mounted, while the lower end of the said member terminates in a bottom bracket $a^5$, through which the crank-axle of the auxiliary foot-driving gear passes. From the back of the seat-pillar clip stout backstays $a^6$ are directed to the ends or near the ends of the rear axle of the machine, the said backstays, with the seat pillar-tube, thus being arranged in a tripod form; and within the space comprehended thereby the motor and driving-gear are arranged and are supported by a supplementary foundation-framing $b$, (best shown in Fig. 8,) formed by directing rearwardly from the auxiliary crank-axle bracket $a^5$ a pair of short stays $b'$ $b^2$, terminating in a junction or cross piece $b^3$, from which a pair of rearwardly-directed tubes or sleeves $b^4$ (which are considerably separated) proceed and inclose or encircle a pair of connecting bolts or stays $b^5$, directed between the said cross-piece and the casing surrounding the differential gearing, and within the rectangular space $c$ thus inclosed the crank-box supporting the motor is secured by suitable means, as hereinafter described.

The carbureter $d$ (see Figs. 9, 10, 10$^A$, and 11) for generating the supply of hydrocarbon vapor for the motor is located within the space at the front of the frame bounded by the seat-pillar $a^2$, top tube $a^7$, ball-head sleeve $a^8$, and front down-tube $a^9$ and is rigidly secured in position by clips, such as $d'$. The said carbureter consists of a casing $d^2$, which is divided off into an upper chamber $e$ and a lower compartment $f$, the lower one of which constitutes the evaporating-chamber, while the other is an oil store or reservoir, with communication made between the said chambers by a tube or sleeve $d^3$, passing from the bottom $e'$ of the reservoir $e$ and extending for a distance into the evaporating-chamber and with the part coming within the reservoir being provided with a small hole $d^4$, leading from the reservoir to a valve $d^5$, adapted to control the flow of oil to the said generating-chamber. This valve is opened and closed by a controlling rod or stalk $d^6$, having a conical lower end $d^7$ taking into a corresponding seating $d^8$ of the valve, while its upper end is screwed at $d^9$ and passes through a screw-box $d^{10}$, fitted to the top of the casing. The said stalk terminates outside the casing in a hand-wheel or other turn $d^{11}$, disposed in convenient reach of the driver of the vehicle and the rotation of which in one way or the other raises or lowers the coned foot end of it from or onto the valve-seating, and so regulates the size of the passage $d^{12}$ and controls the flow of oil, which is preferably petrol, benzolin, or like light liquid hydrocarbon, from the one chamber to the other. A latch or catch of suitable form is provided for automatically retaining the turn in its set position and which may consist of a bolt $d^{13}$, sliding within the fitting $d^{14}$ and having underneath it a spring $d^{15}$, adapted to impel the nose end of the said bolt into engagement with one or other of the series of notches or sinkings $e^{15}$ on the under side of the turn or regulator wheel. The regulator-stalk is inclosed throughout in a sleeve $d^{16}$, which is continued into the fitting $d^{14}$ and forms a guide for the stalk.

Figures 9, 10, 10A, 11:
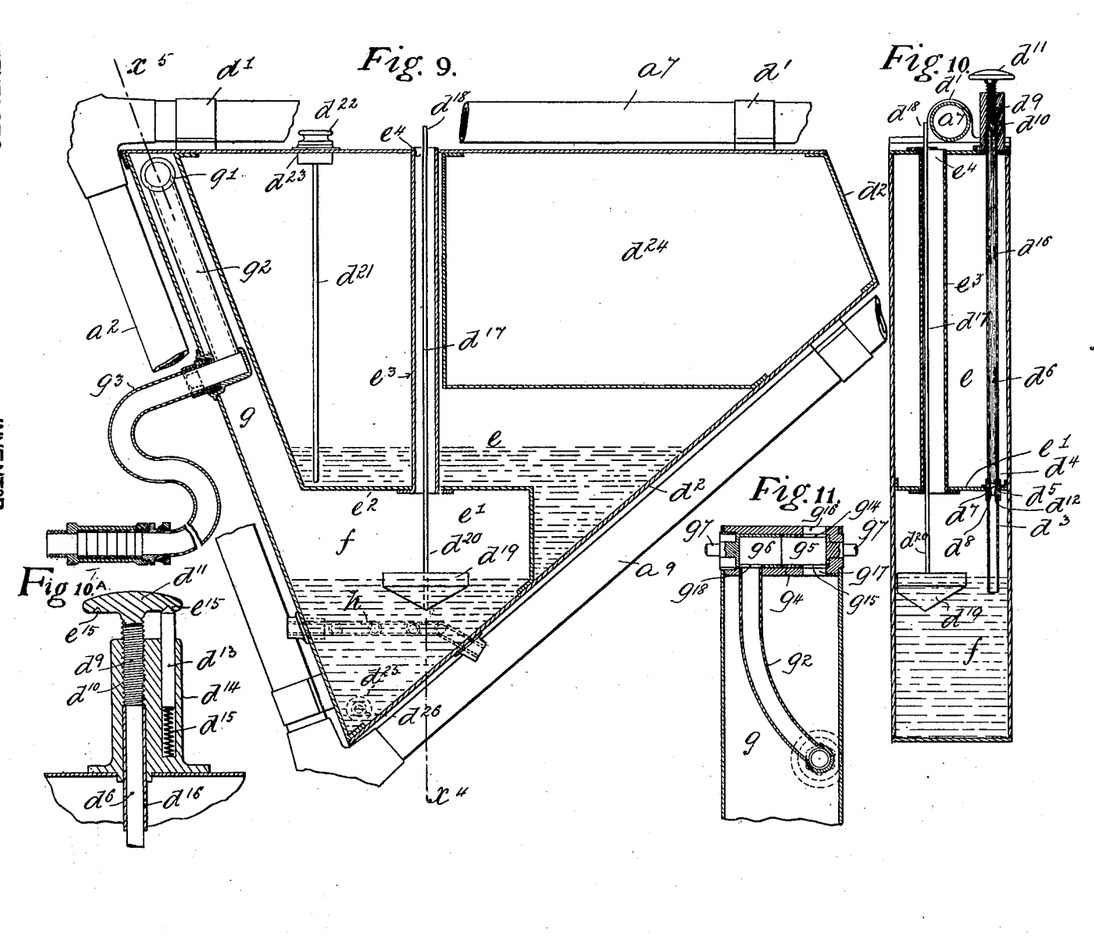

In communication with the evaporating-chamber $f$, which has a considerable air-space $e'$ between the surface of the oil contained therein and its roof $e^2$, is an air-shaft $e^3$ with its open upper end $e^4$ communicating with the atmosphere outside of the casing, while passing up the interior of it is an indicating-stem or long stalk $d^{17}$, with the outer end $d^{18}$ extending above the top wall of the casing and indicating by the extent of its protrusion the amount of oil within the evaporating-chamber, this being effected by the employment of a float $d^{19}$ in connection with the lower end $d^{20}$ of the stem floating upon and rising and falling with the surface of the oil. Also in communication with the said evaporating-chamber is a vapor-shaft $g$, passing upward to an air-inclusion valve $g'$, from which a combustible mixture of air and vapor is conveyed through a pipe $g^2$, preferably located within the shaft $g$, and an external continuation $g^3$ of it to the engine or motor. The said air-inclusion or mixing valve may be of any suitable construction, but preferably consists of a body part $g^4$, provided with a pair of rotatable hollow plugs $g^5$ $g^6$, each having necked ends $g^7$ extending outward and respectively fitted with handles or levers $g^8$ $g^9$, adapted to be turned by the driver either directly or through the medium of links $g^{10}$ $g^{11}$, and other levers or handles $g^{12}$ $g^{13}$ for both regulating the amount of air to be admitted for mixing with the oil-vapor and also for controlling the passage of the mixture to the motor. The former operation is effected by the plug $g^5$, which has holes $g^{14}$ $g^{15}$, adapted to be brought more or less coincident with other holes $g^{16}$ $g^{17}$ in the body of the valve and communicating, respectively, with the atmosphere and the vapor-shaft, while by turning the plug to such an extent as to bring its holes opposite to the solid or unpierced parts of the body the admission of vapor and air is prevented altogether. The flow of mixture from the valve to the motor is controlled by the other rotatable plug $g^6$, which has a single outlet $g^{18}$, adapted to be brought more or less over or to be taken altogether away from the open end $g^{19}$ of the pipe $g^2$, leading to the motor. The height or quantity of oil in the evaporating-chamber is thus indicated to the driver by the float and its stem and kept constant by the regulated flow of oil from the reservoir through the needle-valve, while it is further kept at such a temperature as to assist its evaporation by means of a coiled or curved or horizontal zizzagged pipe or passage, such as $h$, arranged within the lower part of the generating-chamber and within the oil contained therein and through which heated air or the hot exhaust from the exhaust-silencer $h'$ of the engine passes by way of the pipe $h^2$.

The level of the oil in the reservoir or oil-store chamber may be indicated or gaged either by a gage-rod, such as $d^{21}$, having a screwed cap $d^{22}$ taking into the orifice $d^{23}$, by means of which the reservoir is filled with oil, or I may employ for this purpose a float and stem which rises or falls with the said oil, similar to that shown in conjunction with the evaporating-chamber.

A portion of the casing of the apparatus is partitioned off into the chamber $d^{24}$ for containing within it the electrical sparking apparatus for igniting the explosive charges in the engine-cylinder, while both the reservoir and the evaporating-chamber are provided at their lowest points with outlets $d^{25}$, closed by screw plugs or caps $d^{26}$ and through which their contents may be withdrawn when required.

Figures 5, 6, 7:
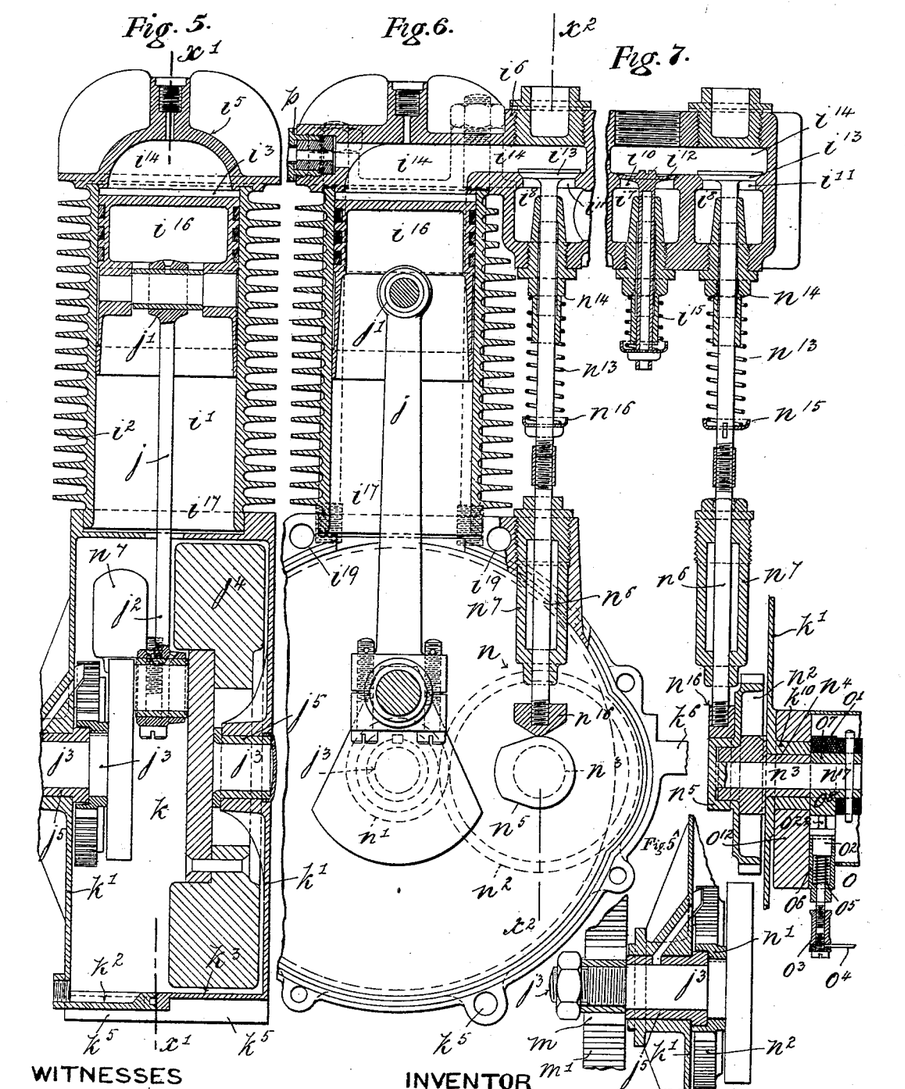
Fig. 5 represents a transverse vertical section of the motor, with its fly-wheel, crank-box, and other accessory parts, taken upon the dotted line $x$, Fig. 3, but upon an enlarged scale. Fig. $5^A$ shows a detail.
Fig. 6 is a longitudinal vertical section of the said motor upon the dotted line $x'$, Fig. 5.
Fig. 7 is a further longitudinal vertical section taken upon the dotted line $x^2$, Fig. 6, and showing the arrangement and relative dispositions of the motor inlet and exhaust valves, with their gearing, and the sparking device.

The motor $i$, which I propose to employ in connection with my improved motor-cycle, consists of a cylinder $i'$, externally provided with radiators $i^2$ for keeping the same cool and having the upper end $i^3$ closed by a combined top cover and valve-box $i^5$, which is preferably made as a single casting, with the valve-box part $i^6$ provided with a pair of chambers $i^7 i^8$, the latter of which is in communication with the vapor-supply pipe $g^3$ from the carbureter and the former with the exhaust-pipe $i^9$ and both having seated openings $i^{10} i^{11}$, respectively fitted with spring-closed valves $i^{12} i^{13}$, leading into the compression and combustion chamber part $i^{14}$ in the cylinder-cover. The piston $i^{16}$ may be either of the ordinary or any special construction and has the upper end of the piston-rod $j$ jointedly connected to it at $j'$, while the lower end $j^2$ is connected to a crank-shaft $j^3$, provided with a fly-wheel $j^4$ and running in bearings $j^5$, (which may be provided with antifriction-balls running in suitable ball-races,) located within the opposite sides $k'$ of a crank-box $k$, which supports the cylinder $i'$ and is secured to the lower open end $i^{17}$ thereof by means of bolts $i^{67}$ taking into holes $i^{19}$ or otherwise. This crank-box, in addition to completely covering in the crank, crank-shaft, and fly-wheel of the engine, also incloses the gearing for opening the exhaust-valve. It is preferably made in two vertically-divided sections or halves $k^2 k^3$, which are bolted together by bolts $k^4$, passed through coincidently-eyed lugs $k^5$ on the meeting edges of the sections, which also have lugs or projections $k^6$, disposed in positions suitable to receive the pairs of bolts $k^7$, by which the crank-box and motor carried by it are secured to lugs $k^8$, depending from both the under side of the differential gear-casing and from the cross-piece $b^3$ of that part of the framing (previously described) coming between the auxiliary crank-axle bracket and the said casing. The lugs $k^6$ are important and useful in that by them the motor is efficiently and substantially attached to the framing in such manner as to materially assist in strengthening the structure. These lugs on the crank-case are in fact sufficient in themselves to hold the front and rear parts of the tricycle together. The chief function of the stay-bolts $b^5$ within the tubes $b^4$ is to keep the parts of the framing together when the motor is detached. Where ball-bearings are provided for the motor-shaft to run upon, the cups and cones are made specially stout in order to stand the vibration and strains set up in driving, and the balls running within the said races are of large diameter.

The crank or motor shaft $j^3$ is provided at $j^6$ (on the outside of the crank-box) with a pinion $m$, (shown in the small view marked Fig. 5$^\text{A}$,) engaging with a large toothed ring $m'$, constituting the driving-wheel of the differential gearing, while upon another part of the said crank-shaft coming internally within and being inclosed by the crank-box is a second pinion $n'$, gearing with and driving a toothed wheel $n^2$, controlling the exhaust valve-gear $n$. This said wheel preferably has twice as many teeth as its pinion $n'$, and consequently makes one revolution only to every two revolutions made by the crank-shaft—hence a "two-to-one" valve-gear. The said valve gear wheel $n^2$ is mounted on a separate shaft $n^3$, running in a bearing $n^4$ in one side of the crank-box, and has secured to it a rotating cam $n^5$, the throw of which is arranged to act upon the wiper end $n^{16}$ of and give a lift to a vertical valve-rod $n^6$ once to every two strokes of the engine. This said rod (whose lower end, together with the cam and wheel of the two-to-one gear, is inclosed in the crank-box) passes through a guide-sleeve $n^7$ and upward into the valve-box and is there connected to and is adapted to intermittently lift the exhaust-valve $i^{13}$ from its seat, the return movement of the said valve being effected by a spring $n^{13}$, disposed around the rod and between an abutment $n^{14}$ on the valve-box and an opposite abutment $n^{15}$ on the rising-and-falling rod.

Figures 2, 3, 4:
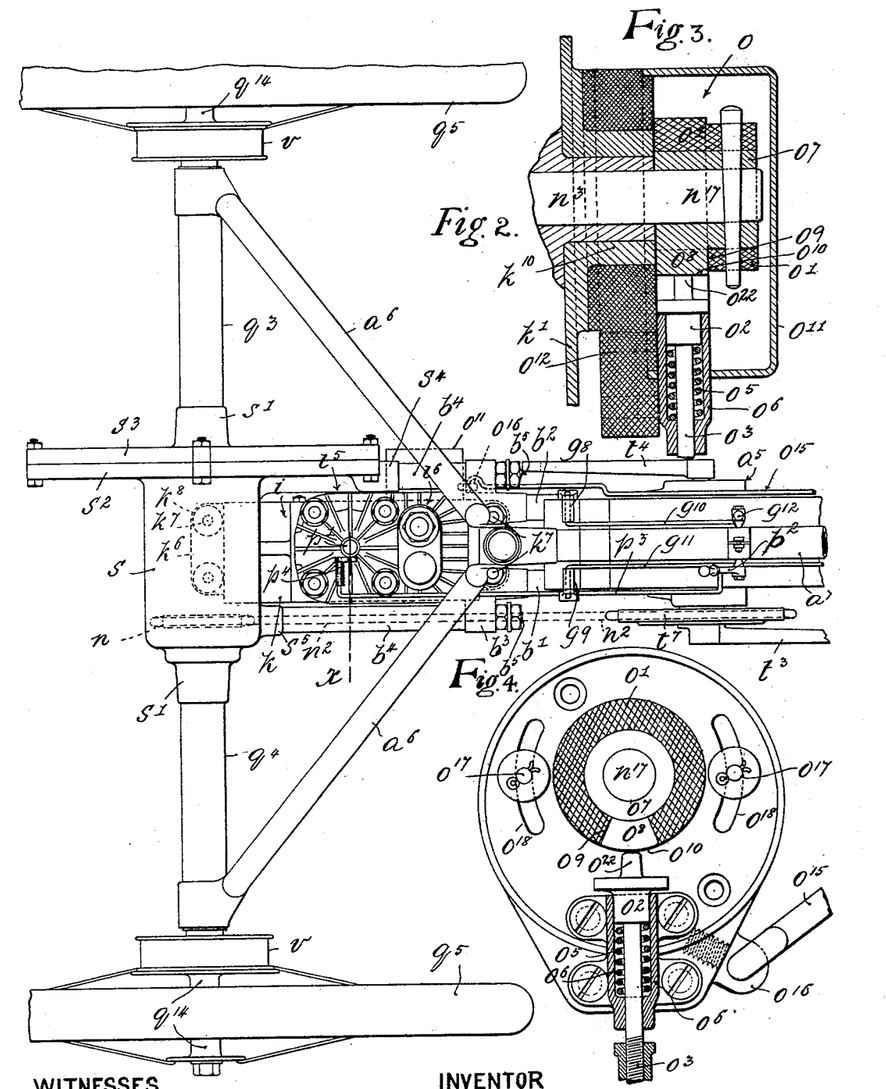
Fig. 2 is a top side plan of the same part of the vehicle, but with the duplicate band-brakes and the means for operating them from a single brake-lever not being shown.
Fig. 3 represents a full-size transverse vertical section of the adjustable contact-maker in connection with the electrical firing device.
Fig. 4 is an elevation of the same with the casing or cover removed and a part shown in section.

The electrical contact device $o$ of the sparking apparatus for igniting or firing the compressed charge within the cylinder is disposed upon the outside of the crank-box and consists of a hollow block or sleeve of ebonite or other insulating material $o'$, secured to and surrounding the outer end $n^{17}$ of the two-to-one valve-gear shaft $n^3$. A sliding steel or other metal contact-piece $o^2$ is also provided, one end, $o^3$, of which is connected with a current-wire $o^4$ from an induction-coil, while the other end, $o^{22}$, is kept by means of an encircling spring $o^5$, inclosed in a casing $o^6$ in constant and positive contact with the periphery of the bush or ring of ebonite $o'$, rotating with the said valve-gear shaft, to which is also attached a steel or other metal sparking piece or cam $o^7$, electrically connected in the usual way with the ignition-chamber and having a portion $o^8$ of it extending through a clearance $o^9$, provided in the insulating-ring, with the outer part $o^{10}$ of the said cam coming flush with the periphery of the said ring and within the path of the contact-piece. $o^{11}$ is a cover detachably connected by suitable spring or other catches, and by arranging the parts securing the sparking-cam to the two-to-one-gear shaft in manner as described it makes contact with the contact-piece and completes the electric circuit for firing once to every two revolutions of the crank-shaft of the motor, while in order to provide means for varying the time at which the circuit is completed to admit of the spark passing and firing the charge the contact-piece $o^2$ is mounted upon a base $o^{12}$, made of insulating material, encircling and being free to turn upon a bush $k^{10}$ on the crank-box. A lever $o^{13}$ is pivoted to the framing of the machine at $o^{14}$ and has directed from it a connecting-rod $o^{15}$, terminating in an eye $o^{16}$, secured to the contact-piece base, whose rotation about the bush $k^{10}$ is limited by studs $o^{17}$ on the crank-box taking through curved slots $o^{18}$ in the said base. By turning this lever one way or the other the driver of the vehicle can communicate a corresponding movement to the contact-piece to change its position, so that the sparking-cam $o^7$ wipes over the said contact earlier or later (as the case may be) in the revolution of the valve-gear shaft and completes the circuit for firing the charge at an earlier or later stage of the compression-stroke of the motor-piston, whereby the driver is enabled to determine the moment of firing according to the speed at which the engine is running or according to other circumstances as he may require. The sparking-points are arranged at opposite points in the compression-chamber of the cylinder-head, as usual, and a return-circuit wire proceeds from the negative point to the induction-coil. In addition to this electrical firing-gear the motor-cylinder may be provided with a lamp-ignition tube of the ordinary type at $p$. (See Fig. 6.)

$p'$ is a starting-valve which is opened to admit air to pass out of the cylinder on starting by means of a lever $p^2$, rod $p^3$, and cock $p^4$.

The operation of the motor is thus as follows: On the piston commencing the descending movement of the first or suction stroke a charge of explosive mixture (the richness or relative proportions of atmospheric air and oil-vapor is determined by the mixing-valve of the carbureter) is drawn through the regulator-valve $g^3$ and past the inlet-valve (which is lifted off its seat against the pressure of its spring $i^{15}$) into the chamber $i^{14}$ of the cylinder, where it is compressed by the return or compression stroke of the said piston. At a predetermined point in this compression-stroke the sparking-cam is brought round to the contact-piece, the circuit is completed, and the compressed charge fired for giving impulse to the piston. The exhaust-cam on the valve-gear shaft has during these suction and compression strokes been inoperative; but while the piston is descending or making the second or impulse stroke after the explosion the said cam commences to act upon the valve-rod, which is lifted, and the exhaust-valve is opened and remains open during the time that the piston is ascending or making the exhaust stroke, on the completion of which the rod is again allowed to fall and the exhaust-valve is closed automatically by its spring.

A pipe $i^9$ leads from the exhaust-valve outlet to an exhaust-silencer $h'$, which is preferably suspended from the frame-tubes $b^7 b^2$ and immediately behind the crank-axle bracket instead of being suspended from the sleeve of the main axle, as ordinarily. The branch pipe $h^2$ passes from the said silencer to the worm, coil, or the like located within the vaporizing-chamber of the carbureter, so that the exhausted gas thereby assists in the vaporization of the petroline or other hydrocarbon.

The small motor-pinion $m$ on the outer end of the crank-shaft meshes with a large driving toothed wheel or ring $m'$ in connection with the differential or balance gear $m^2$ of the main axle $q$. The type of main axle which I propose to employ is that known as the "Starley-tricycle" axle, which is made in two rotating halves $q' q^2$, inclosed in fixed sleeves $q^3 q^4$, provided with ball-bearings and respectively made fast at their outer ends to the running-wheels $q^5$, while their ends are coupled together by a balance-gear so arranged as to admit of the said halves independently rotating at different rates of speed at such times that the machine is turning a corner or rounding a curve.

Figure 1:
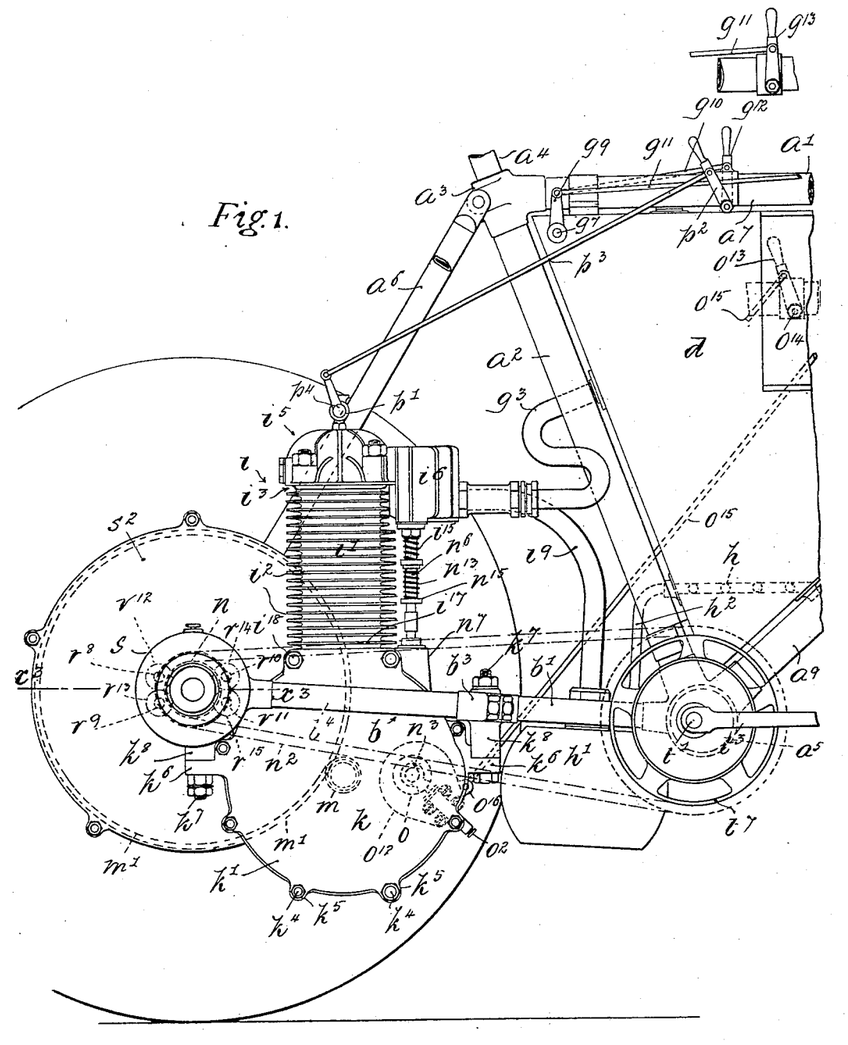
Figure 1 represents a side elevation of the rearward portions of a motor-tricycle embodying my improvements.

In the present arrangement the differential or balance gear (best shown in Fig. 8) is entirely inclosed within a gear case or cover $s$ into the sleeves $s'$, at the opposite sides of which the inner ends of the axle-tubes $q^3 q^4$ take and terminate against ball-raced cups $q^6$, through which the inward ends of the axle-halves extend into the interior of the gear-case, where they are connected together by a peg $q^7$ on the one half taking into a socket $q^8$ in the opposed end of the other, while shrunk upon the said axle-sections, with their ball-races $q^{10}$ opposed to those $q^{11}$ of the beforementioned cups $q^6$ are bearing-cones $q^{12}$, between which and the said cups sets of balls $q^{13}$ are disposed, so that the inner ends of the rotating axle-sections run on ball-bearings coming within the case or cover of the balance-gear, while their outer ends run upon other sets of balls located between the races of fixed cups having sleeve extensions screwing into the ends of the axle-cover tubes, and corresponding cones formed on the inner faces of the hubs $q^{14}$ of the running-wheels, which hubs are keyed to and rotate with the axle. The cones on the inner ends of the axle-sections have inwardly-directed necks or extensions $q^{15}$, which respectively take within the opposite open ends $r'$ $r^2$ of a tubular box or carrier sleeve $r^3$, which incloses or carries the several pinions and accessory parts of the balance-gear. One end $r^4$ of this sleeve is connected, preferably by means of a series of radiating arms or spokes $r^5$, to the large driving tooth wheel or ring $m'$, gearing with the the motor-pinion $m$, while at the other end $r^6$ is a small driving toothed wheel $n$, secured by a locking-ring $n'$ and connected by means of drive-chain $n^2$ with the auxiliary foot or pedal-driving mechanism. The extreme inward ends of the axle-sections $q'$ $q^2$ are provided, respectively, with pinions $r^6$ $r^7$, while the rotating carrier-sleeve is provided with four longitudinal spindles $r^8$ $r^9$ $r^{10}$ $r^{11}$, (indicated by dotted lines in Fig. 1,) respectively, carrying loose pinions $r^{12}$ $r^{13}$ $r^{14}$ $r^{15}$, two of which—viz., $r^{12}$ and $r^{14}$—engage with the one axle-pinion $r^6$, while the other two—viz, $r^{13}$ and $r^{15}$—mesh both with the pinions $r^{12}$ $r^{14}$ and with the other axle-pinion $r^7$, whereby the said carrier-sleeve, which is also the driving-sleeve, is connected with the axle in such a manner as to normally admit of both halves being driven at the same speed while still allowing of the said halves having independent rotation at varying rates when required. The case or cover $s$, in which the whole of this gear is inclosed, is tubular or cylindrical in form and has an enlarged annular race $s^2$ at one end, within which the large toothed driving-wheel $m'$ runs, said race having a vertically-divided half or section constituting a removable end $s^3$, secured in position by bolts or the like, while the other or body part has lugs $s^4$ $s^5$, into which the ends of the framing-bolts $b^5$ take, and whereby the said gear-case is supported in addition to being carried by the axle-cover tubes. A gap in the edge of the annular race admits a part of the motor-pinion $m$ to intergear with the driving-ring, and a cover for the said pinion may be bolted to the gear-case at this point.

Figures 12, 13, 14, 15, 16, 17, 17A:
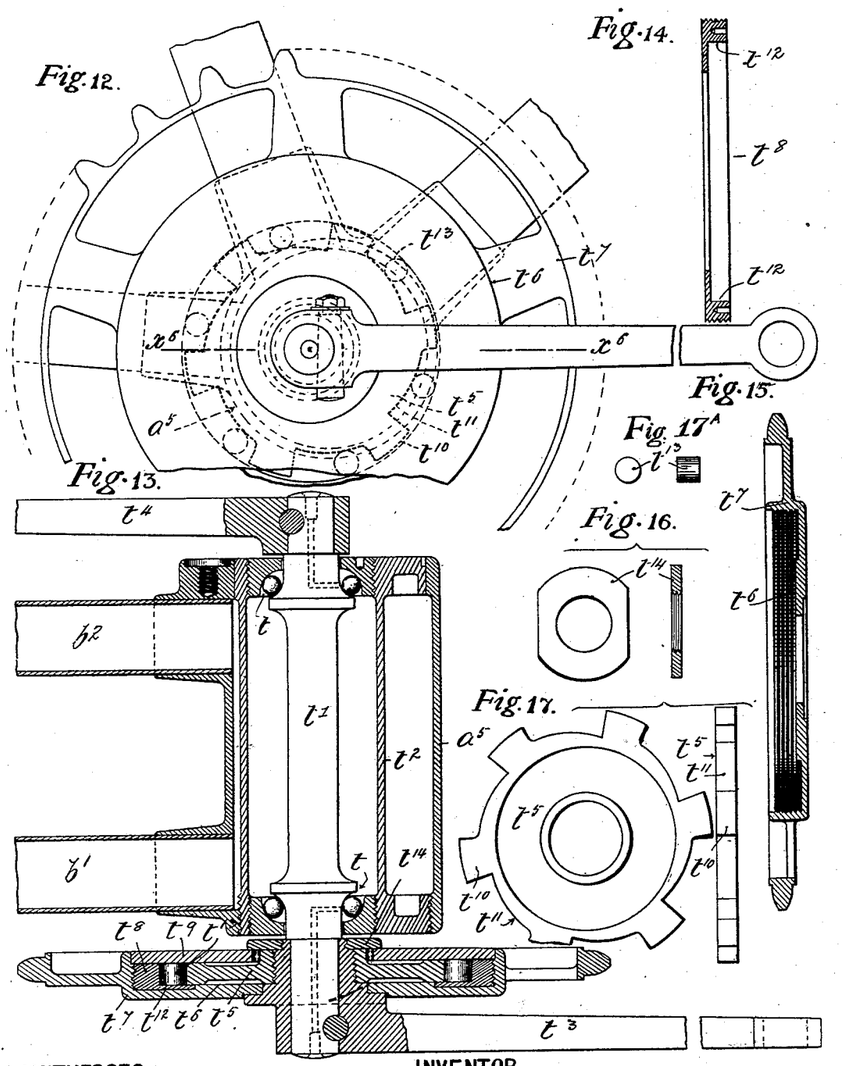
Fig. 12 is an enlarged elevation of the auxiliary foot-operated clutch-driving gear.
Fig. 13 is a horizontal section thereof upon the dotted line $x^6$.
Figs. 14, 15, 16, and 17 represent some of the detail parts of the clutch-driving gear separately.
Figures 18, 20, 21:
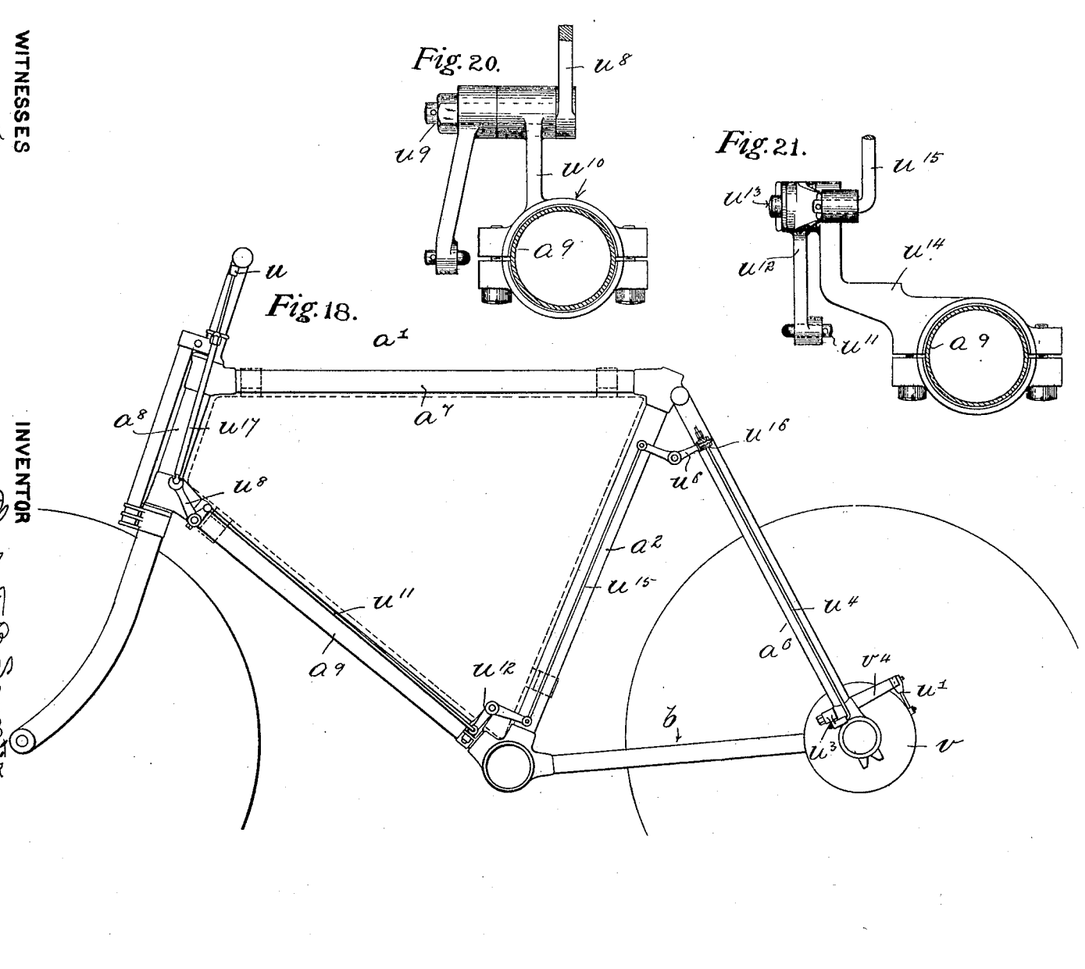
Fig. 18 is a general view of the framing, showing the arrangement of the series of bell-crank levers and connecting-rods by which the movement of a single brake-operating lever is communicated to a pair of band-brakes encircling drums carried, respectively, by the rear running-wheels.
Figs. 20 and 21 represent other elevations of two of the bell-cranked levers of the brake mechanism separately.
Figure 19:
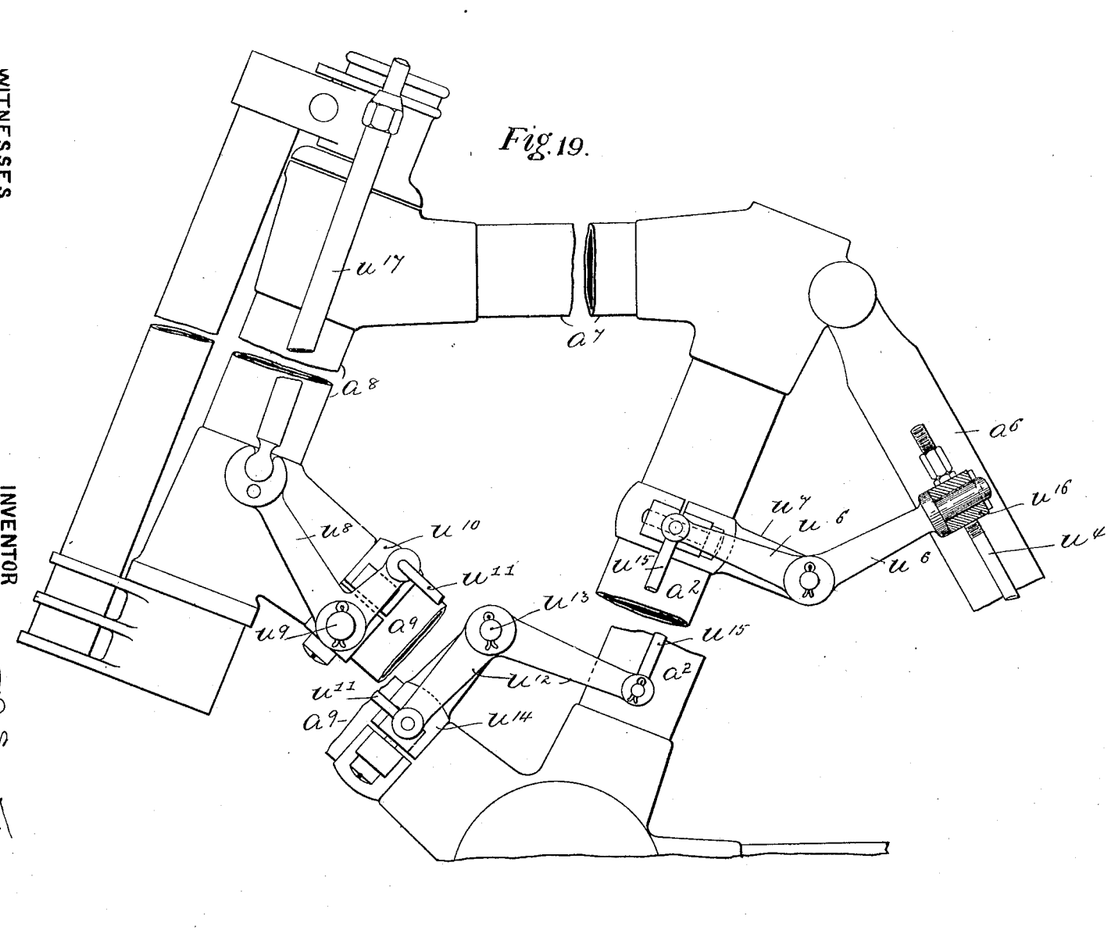
Fig. 19 is a view showing the system of levers of the brake mechanism upon an enlarged scale.

The auxiliary foot or pedal driving and clutch mechanism is provided for the purpose of starting the motor and assisting it when required, while at other times the pedals are "free" and can be held stationary to form rests for the feet of the rider. The crank-axle $t'$ is mounted on bearings $t$, preferably disposed in a sleeve $t^2$, eccentrically mounted within the bottom bracket $a^5$ to admit of the adjustment of the driving-chain $n^2$, and is provided at its ends with fixed pedal-cranks $t^3$ $t^4$, the boss of the former of which has screwed or otherwise fitted to it a fixed clutch-plate or friction-disk $t^5$, surrounded or inclosed by a dished center part $t^6$ of a loose sprocket driving-wheel $t^7$, said dished center being inside screwed to receive a clutch-ring $t^8$, while the sprocket-wheel itself is so mounted as to be capable of running on independently of the pedal-axis when the cranks are held stationary; but the said crank is operatively connected, when required, with the said sprocket-wheel for starting or auxiliary driving by the friction or clutch plate $t^5$, which is inclosed between an outer plate $t^9$, fixed to the crank-boss, and the closed side of the dished center of the loose sprocket and having a series of projections $t^{10}$, with intervening inclines $t^{11}$, at the bottoms of which and interposed between them and opposed periphery $t^{12}$ of the clutch-ring $t^8$, connected now with the sprocket, are a series of loose rollers $t^{13}$. (Shown also in Fig. 17$^A$.) Normally and when the pedals are held stationary and the sprocket is running on independently the inner periphery of the clutch-ring wipes noiselessly over the outer peripheral edges of the projections on the friction-disk $t^5$, and the rollers $t^{13}$ are kept at the bottoms of the inclines; but when auxiliary driving power is required the pedals are driven around, which causes the said friction-disk to rotate with the crank and to be wedged or operatively connected with the sprocket-wheel by the rollers being caused to run up the inclines and bind against the clutch-ring $t^8$ on the said sprocket, and the friction resulting thereby sets up a driving connection between the two parts, and power is transmitted, through the chain, to the small driven cog-carrier sleeve of the differential gear. Immediately the rotation of the pedals ceases, the friction-clutch is released, and the chain-wheel is again free for independent rotation. $t^{14}$ (see also Fig. 16) is the locking-ring by which the plate $t^9$ is secured. This construction of clutch is positive in its action and perfectly silent when the sprocket-wheel is running free.

Figures 22, 23, 24:
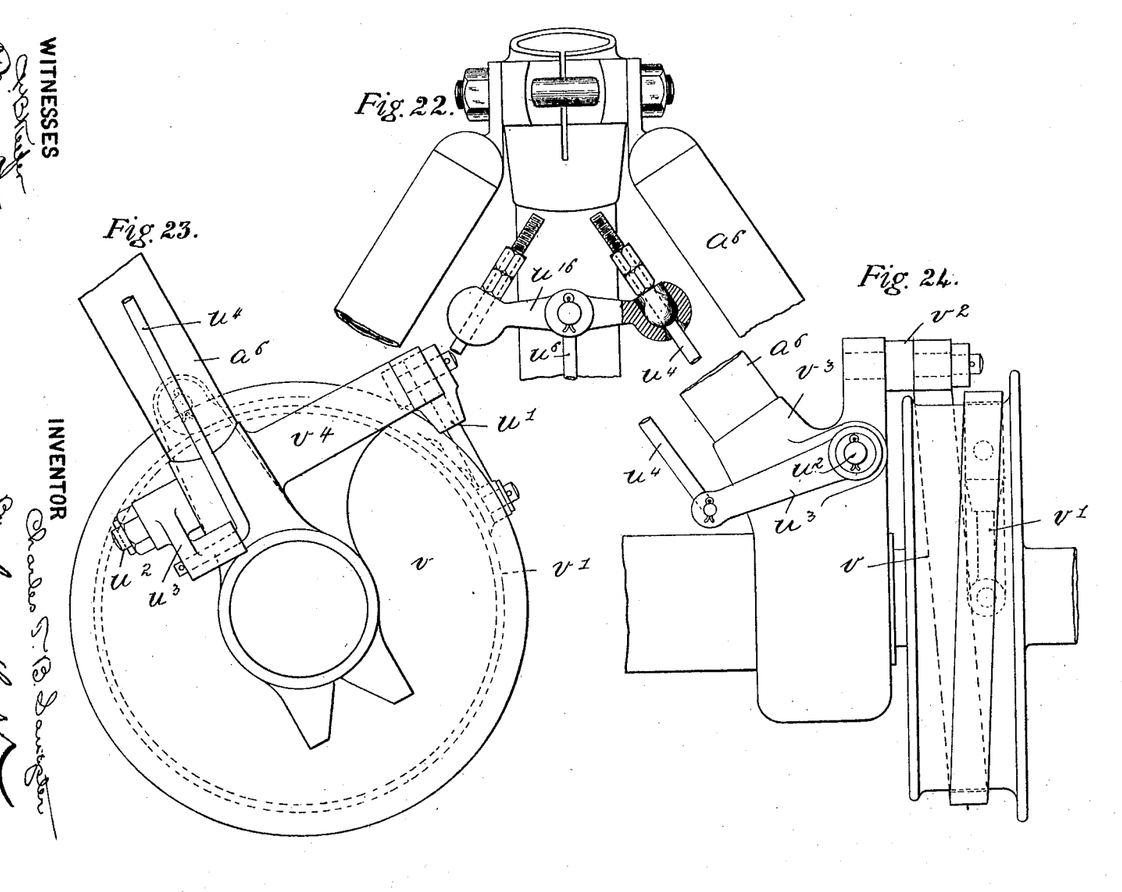
Fig. 22 represents, partly in section and partly in elevation, the connection by which the upper ends of the branching rods proceeding to the respective brakes are secured together and to the system of operating or power-transmission mechanism.
Figs. 23 and 24 show two different elevations of one of the band-brakes and the drum on the rotating axle upon which it acts.

In connection with a motor-tricycle of the hereinbefore-described construction I may employ a pair of powerful band-brakes, (one of which is shown in Figs. 23 and 24,) preferably operated in common by a single lever $u$, fulcrumed to the steering-handles of the machine, and each consisting of a pulley or drum $v$, secured to the inner side of the hub of a running wheel and encircled by a preferably leather-faced steel band $v'$, one end of which may be made fast to a bracket $v^2$ or equivalent fitting attached to a fixed part of the machine-framing, such as the connection $v^3$, between the lower end of a backstay and the axle-tube, while the other end is suitably connected to a lever $u'$, attached to and designed to turn with a spindle $u^2$, passing through a bearing $v^4$ in the aforesaid connection fitting $v^3$ and provided with a second lever or arm $u^3$, which is jointed to the lower termination of a power-transmission rod $u^4$, running parallel with and contiguous to the said backstay $a^6$, with both the transmission-rods terminating in common at a point adjacent to the seat-pillar clip of the framing in a coupling $u^{16}$, carried by a lever $u^6$, carried by a bracket $u^7$ on the framing and to which a rocking movement is imparted from the brake-lever on the handle-bar by a plunger $u^{17}$, bell-cranked lever $u^8$, pivoted at $u^9$ to a bracket $u^{10}$, a connecting-rod $u^{11}$, a second bell-cranked lever $u^{12}$, fulcrumed at $u^{13}$ to a bracket $u^{14}$, and a second connecting-rod $u^{15}$, running parallel with the seat-tube, although I may easily arrange for the lever-ended spindles $u^2$ to be turned for applying the brake by means operated by the foot of the driver, in which case the front or steering wheel might be provided with an auxiliary hand-operated brake of the plunger type.

Guide-eyes for the operating-rods may be secured by clips to the backstays, and the return movement of the rods may be assisted in order to rapidly take off the brakes by springs encircling the rods and arranged between fixed or adjustable abutments or stops on the said rods and similar abutments on stationary parts of the machine.

Having fully described my invention, what I desire to claim and secure by Letters Patent is—

1. In a motor-driven tricycle, the combination with a framing having at the rear part stays or members proceeding from the seat-tube and terminating in a junction-piece, such as $b^3$ disposed between the said seat-tube and the rear axle, of a motor provided with a crank-box having lugs or projections, such as $k^6$, adapted to be bolted respectively to the junction $b^3$, and to the casing inclosing the rear axle, whereby the motor is mounted forward of the said rear axle and is secured to the framing in such a manner as to considerably strengthen the structure, substantially as described and set forth.

2. In a motor-driven tricycle, the combination with a framing having members proceeding rearwardly from the seat-tube and terminating in a junction-piece $b^3$, from which a pair of separated stay-bolts proceed to the casing inclosing the rear axle, of a motor provided with a crank-box which is located within the space comprehended between the stay-bolts and is attached by lug projections at front and back respectively to the junction and to the axle-casing, substantially as and for the purpose described and set forth.

3. In a motor-driven tricycle, the combination with a framing having members proceeding rearwardly from the seat-tube and terminating in a junction disposed between the said seat-tube and the rear axle, of a motor provided with a crank-box which is attached by means of lugs at front and back respectively to the said junction and to the casing of the said axle, and incloses an exhaust-valve-operating gear, comprising a pinion such as $n'$, a toothed wheel $n^2$, a cam $n^5$ connected with $n^2$ and adapted to lift a valve-rod $n^6$, once to every two rotations of the main shaft, substantially as described and set forth.

4. In a motor-driven tricycle, the combination with a framing having members proceeding rearwardly from the seat-tube and terminating in a junction disposed between the said seat-tube and the rear axle, of a motor provided with a crank-box which is attached by means of lugs at front and back respectively to the said junction and to the casing of the said axle, and inclose an exhaust-valve-operating gear, comprising a pinion such as $n'$, a toothed wheel $n^2$ a cam $n^5$, connected with $n^2$ and adapted to lift a valve-rod $n^6$, once to every two rotations of the main shaft, which said valve-gear acts in conjunction with a sparking mechanism consisting of a revolving cam $c^7$, a revolving and apertured insulation-bush $o'$, and a contact $o^2$, mounted on a revoluble base $o^{12}$, substantially as described and set forth.

5. In a motor-driven tricycle the combination with the framing of which the rear part has rearwardly-directed members terminated by a junction-piece between which and the rear axle, the motor is mounted and secured by means of lugs upon its crank-case being bolted to the said junction and the casing of the axle respectively, of a carbureter located with the space comprehended by the members of the front of the said framing and provided with an externally operated and regulated valve $d^5$, $d^6$, communicating between the reservoir and generating-chamber, a float $d^{19}$, and stalk $d^{17}$, for indicating the level of oil in the said generating-chamber, a vapor-shaft $g$, with air inclusion and mixing valve $g'$, with the whole arranged and operating, substantially as described and set forth.

6. In a motor-driven tricycle the combination with the framing of which the rear part has rearwardly-directed members terminated by a junction-piece between which and the rear axle, the motor is mounted and secured by means of lugs upon its crank-case being bolted to the said junction and the casing of the axle respectively, of auxiliary foot-operated clutch mechanism comprising a sprocket-wheel $t^7$, gearing by chain with a pinion connected with the rear axle and a clutch-disk $t^5$, having projections $t^{10}$, and inclines $t^{11}$, made fast with one of the cranks $t^3$, on an auxiliary crank-axle and operatively connected with the said loose sprocket by interposed rollers, substantially as described and set forth.

7. In a motor-driven tricycle the combination with the framing of which the rear part has rearwardly-directed members terminated by a junction-piece between which and the rear axle, the motor is mounted and secured by means of lugs upon its crank-case being bolted to the said junction and the casing of the axle respectively, of brake mechanism comprising an operating-lever, connecting-rods $u^{11}$, $u^{15}$, bell-cranked levers $u^8$, $u^{12}$, a coupling $u^{16}$ and a pair of branching power-transmission rods adapted to respectively operate band-brakes completely encircling drums secured to and rotating with the hubs of the road-wheels, substantially as described and set forth.

In testimony whereof I have hereunto set my hand in presence of two subscribing witnesses.

CHARLES THOMAS BROCK SANGSTER.

Witnesses:
WILLIAM H. LONG,
ALBERT NEWEY.